(12) United States Patent
Savage-Leuchs

(10) Patent No.: US 11,362,478 B2
(45) Date of Patent: Jun. 14, 2022

(54) HOLLOW CORE FIBER LASER SYSTEM, APPARATUS, AND METHOD

(71) Applicant: Lockheed Martin Corporation, Bethesda, MD (US)

(72) Inventor: Matthias P. Savage-Leuchs, Woodinville, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 361 days.

(21) Appl. No.: 16/720,266

(22) Filed: Dec. 19, 2019

(65) Prior Publication Data
US 2021/0194203 A1    Jun. 24, 2021

(51) Int. Cl.
| H01S 3/10 | (2006.01) |
| H01S 3/067 | (2006.01) |
| H01S 3/0941 | (2006.01) |
| H01S 3/094 | (2006.01) |
| G02B 6/02 | (2006.01) |

(52) U.S. Cl.
CPC ........ *H01S 3/1001* (2019.08); *H01S 3/06754* (2013.01); *H01S 3/0941* (2013.01); *H01S 3/094069* (2013.01); *G02B 6/02304* (2013.01)

(58) Field of Classification Search
None
See application file for complete search history.

(56) References Cited

U.S. PATENT DOCUMENTS

2007/0104431 A1* 5/2007 Di Teodoro ........ H01S 3/06754
385/123

FOREIGN PATENT DOCUMENTS

WO    WO-2021126674 A1 *  6/2021

OTHER PUBLICATIONS

A. Urich, et al., "Delivery of high energy Er:YAG pulsed laser light at 2.94 μm through a silica hollow core photonic crystal fibre", Optics Express, vol. 20, No. 6, Mar. 12, 2012, pp. 6677-6684.
Petru Ghenuche, et al., "Kagome hollow-core photonic crystal fiber probe for Raman spectroscopy", Optics Letters, vol. 37, No. 21, Nov. 1, 2012, pp. 4371-4373.
Fei Yu, et al., "Attenuation limit of silica-based hollow-core fiber at mid-IR wavelengths", APL Photonics, vol. 4, 2019, pp. 1-6.
Andrey D. Pryamikov, et al., "Demonstration of a waveguide regime for a silica hollow—core microstructured optical fiber with a negative curvature of the core boundary in the spectral region > 3.5 μm", Optics Express, vol. 19, No. 2, Jan. 17, 2011, pp. 1441-1448.

(Continued)

*Primary Examiner* — Eric L Bolda
(74) *Attorney, Agent, or Firm* — Michael Best & Friedrich LLP

(57) ABSTRACT

An optical system, apparatus, or method can comprise or implement a seed module to generate and output electromagnetic radiation at a predetermined amplitude and at a predetermined wavelength. The seed module can include at least one non-hollow core optical fiber and at least one hollow core optical fiber. One at least one non-hollow core optical fiber can be optically coupled to one at least one hollow core optical fiber. The non-hollow core optical fiber and the hollow core optical fiber may receive and pass electromagnetic radiation emitted from a laser diode or amplifier.

20 Claims, 2 Drawing Sheets

(56) References Cited

OTHER PUBLICATIONS

Chengli Wei, et al., "Negative curvature fibers", Advances in Opticsand Photonics, vol. 9, No. 3, Sep. 2017, pp. 504-561.

Fei Yu, et al., "Negative Curvature Hollow-Core Optical Fiber", IEEE Journal of Selected Topics in Quantum Electronics, vol. 22, No. 2, Mar./Apr. 2016, 10 pages.

N. M. Litchinitser, et al., "Antiresonant reflecting photonic crystal optical waveguides", Optics Letters, vol. 27, No. 18, Sep. 15, 2002, pp. 1592-1594.

Shou-Fei Gao, et al., "Hollow-core negative-curvature fiber for UV guidance", Optics Letters, vol. 43, No. 6, Mar. 15, 2018, pp. 1347-1350.

Fei Yu, et al., "Single-mode solarization-free hollow-core fiber for ultraviolet pulse delivery", Optics Letters, vol. 26, No. 8, Apr. 16, 2018, pp. 10879-10887.

Shou-fei Gao, et al., "Nodeless hollow-core fiber for the visible spectral range", Optics Letters, vol. 42, Issue 1, 2017, pp. 61-64 (Abstract only).

Shou-fei Gao, et al., "Hollow-core conjoined-tube negative-curvature fibre with ultralow loss", Nature Communications, vol. 9, No. 2828, 2018, pp. 1-6.

Fei Yu, et al., "Low loss silica hollow core fibers for 3-4 μm spectral region", Optics Express, vol. 20, No. 10, May 7, 2012, pp. 11153-11158.

Muhammad Rosdi Abu Hassan, et al., "Cavity-based mid-IR fiber gas laser pumped by a diode laser", Optica, vol. 3, No. 3, Mar. 2016, pp. 218-221.

Fei Yu, et al., "Spectral attenuation limits of silica hollow core negative curvature fiber", Optics Express, vol. 21, No. 18, Sep. 9, 2013, pp. 21466-21471.

Vladimir S. Shiryaev, "Chalcogenide glass hollow-core microstructured optical fibers", Frontiers in Materials, vol. 2, Article 24, Mar. 24, 2015, pp. 1-10.

J. C. Knight, et al., "Photonic Band Gap Guidance in Optical Fibers", Science, vol. 282, Nov. 20, 1998, pp. 1476-1478.

R. F. Cregan, et al., "Single-Mode Photonic Band Gap Guidance of Light in Air", Science, vol. 285, Sep. 3, 1999, pp. 1537-1539.

Philip Russell, "Photonic Crystal Fibers", Science, vol. 299, Jan. 17, 2003, pp. 358-362.

M. Nisoli, et al., "Generation of high energy 10 fs pulses by a new pulse compression technique", Appl. Phys. Lett., vol. 68, 1996, pp. 2793-2795 (Abstract only).

\* cited by examiner

FIG. 1A
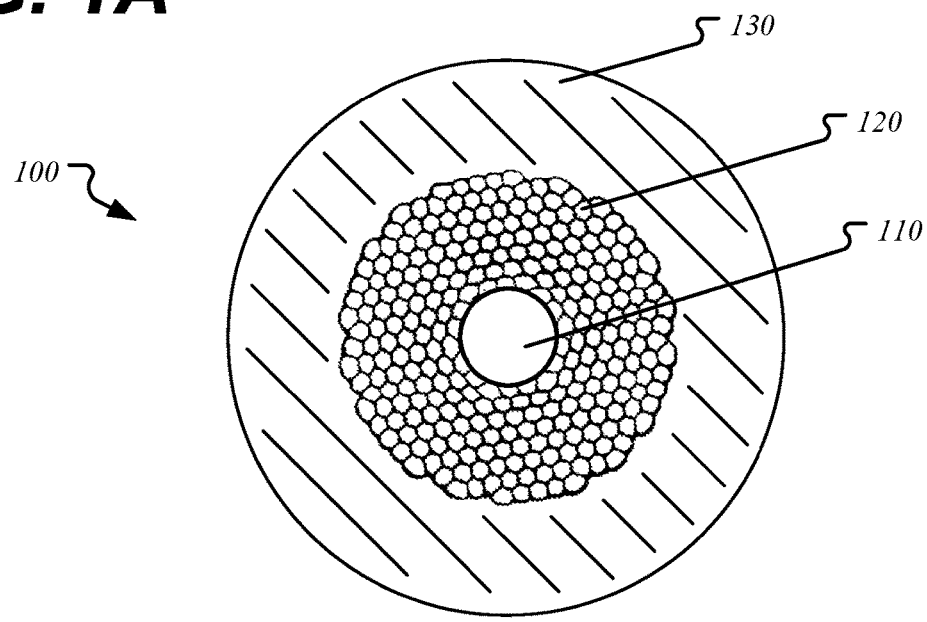
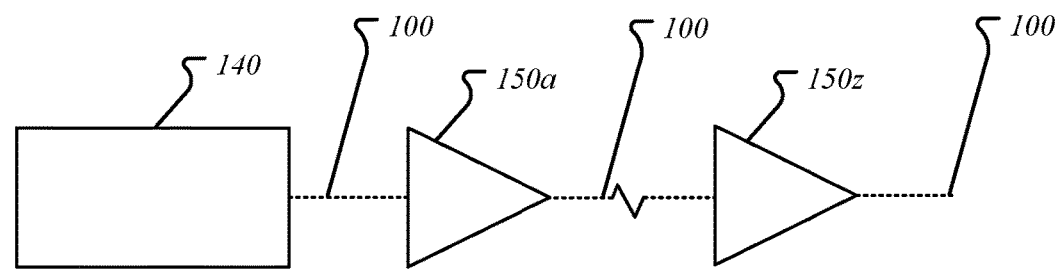
FIG. 1B

HOLLOW CORE FIBER LASER SYSTEM, APPARATUS, AND METHOD

Embodiments of the disclosed subject matter can involve systems, apparatuses, and methods that comprise or implement optical components comprised of at least one hollow core optical fiber and at least one non-hollow core optical fiber optically coupled together.

SUMMARY

Embodiments of the disclosed subject matter involve an optical system including a seed module configured to generate and output electromagnetic radiation at a second predetermined amplitude and at a second predetermined wavelength, the seed module including: a first hollow core optical fiber having a first cladding layer surrounding a hollow core extending a length of the first hollow core optical fiber, the first hollow core optical fiber optically coupling a laser diode configured to emit electromagnetic radiation having a first predetermined amplitude and a first predetermined wavelength, a gain fiber including a doped core extending a length of the gain fiber, a fiber coupler, and a first non-hollow core optical fiber, and an output hollow core optical fiber optically coupled to an output of the first hollow core optical fiber and configured to output electromagnetic radiation to outside the seed module.

According to one or more embodiments of the disclosed subject matter, an optical system can comprise a seed module configured to generate and output electromagnetic radiation at a second predetermined amplitude and at a second predetermined wavelength, the seed module including: a laser diode configured to emit electromagnetic radiation having a first predetermined amplitude and a first predetermined wavelength, a pump signal combiner configured to couple the electromagnetic radiation from the laser diode and electromagnetic radiation circulated through the seed module, a gain fiber including an input, an output, a doped core extending a length of the gain fiber, and a third cladding layer surrounding the doped core, and configured to guide electromagnetic radiation coupled into the doped core from the pump signal combiner, a first non-hollow core optical fiber configured to guide electromagnetic radiation, the first non-hollow core optical fiber having a first cladding layer surrounding a solid core medium extending a length of the first non-hollow core optical fiber, a first hollow core optical fiber configured to guide electromagnetic radiation, the first hollow core optical fiber having a second cladding layer surrounding a hollow core extending a length of the first hollow core optical fiber, a fiber coupler that couples the first non-hollow core optical fiber to the first hollow core optical fiber so as to pass electromagnetic radiation from the first non-hollow core optical fiber to the first hollow core optical fiber, a second hollow core optical fiber configured to guide electromagnetic radiation, the second hollow core optical fiber having the second cladding layer surrounding the hollow core extending a length of the second hollow core optical fiber, and a feedback hollow core optical fiber configured to feedback electromagnetic radiation at an output of the seed module to the pump signal combiner; and an output hollow core optical fiber optically coupled to the seed module and configured to output electromagnetic radiation to outside the seed module.

One or more embodiments can also include a seed module comprising: a first hollow core optical fiber having a first cladding layer surrounding a hollow core extending a length of the first hollow core optical fiber, the first hollow core optical fiber optically coupling a laser diode configured to emit electromagnetic radiation having a first predetermined amplitude and a first predetermined wavelength; a gain fiber including a doped core extending a length of the gain fiber; a fiber coupler; a first non-hollow core optical fiber; and an output hollow core optical fiber optically coupled to an output of the first hollow core optical fiber and configured to output electromagnetic radiation to outside the seed module, wherein the seed module is configured to generate and output electromagnetic radiation at a second predetermined amplitude and at a second predetermined wavelength based on the electromagnetic radiation having the first predetermined amplitude and the first predetermined wavelength.

Embodiments can also include methods of providing, making, and/or using optical systems, or portions thereof, according to embodiments of the disclosed subject matter.

The foregoing paragraphs have been provided by way of general introduction, and are not intended to limit the scope of the following claims. The described aspects, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A is an end view (e.g., end sectional view) of an exemplary hollow core fiber, according to one or more embodiments of the present disclosure.

FIG. 1B is a block diagram of a system according to one or more embodiments of the present disclosure.

DETAILED DESCRIPTION

Figure 2A:
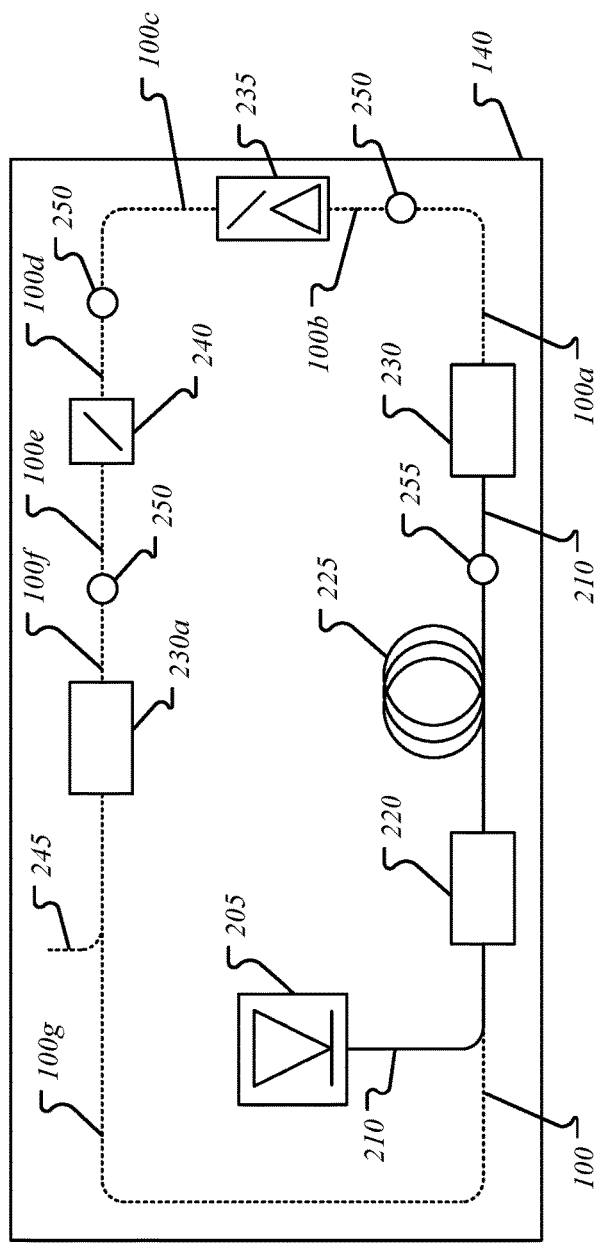
FIG. 2A is block diagram of a seed module according to one or more embodiments of the present disclosure.

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the"

include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

A non-linear optical effect, such as a back-reflection, may degrade performance of an optical system. A poor splice between two ends of a fiber optic cable, for example, a step-index fiber with a glass core, may introduce an interface at the splice location and lead to back-reflections amounting to, for example, 3-4%. Over multiple instances of fiber splicing, a compounding of the back-reflections may occur and spectral quality decrease may be magnified.

Additionally, an optical system utilizing a laser configured to emit high peak power, for example, a continuous wave (CW) fiber laser, may produce one or more new wavelengths via interactions between two or three wavelengths (i.e., four-wave mixing), wherein the light interacts with the glass creating other frequencies which may distort the content of the source signal. Build-up of non-linear signals may propagate or counter-propagate with the source signal, and the background may not be identifiable and corrected when transmitted between stages or components in the optical system.

Back-reflection of the high peak power pulse may damage the fiber or reflect a sufficient amount of power backwards and damage the system. For these reasons, the length of the optical fiber connecting multiple components or stages in the optical system may be kept short, which may further limit the practical applications of the optical system. Thus, an optical fiber is desired which may be utilized to minimize or eliminate the above-discussed non-linear optical effects in an optical system. Furthermore, the desired optical fiber may include features which render length considerations trivial or less important.

Hollow core fibers may reduce non-linear optical effects in optical systems. For example, to reduce back-reflection at splice locations, a hollow core fiber may eliminate the back-reflection almost entirely because a different refractive index between the two ends is not present. At the junction of two hollow core fibers, the electromagnetic radiation (i.e., light or including light) may travel between, for example, a hollow core of air to another hollow core of air. The splice at the junction does not include a solid core being fused with another solid core. Thus, the hollow core of the hollow core fiber in this example system may allow for seamless transition between two ends of a hollow core fiber connection between two hollow core fibers without introducing an interface where back-reflections may occur. The reduction of non-linear effects in hollow core fibers may also allow for fibers of longer lengths to be employed in optical systems.

FIG. 1A illustrates a perspective view of an exemplary hollow core fiber 100 according to embodiments of the disclosed subject matter. The hollow core fiber 100 may include a hollow core 110, a cladding 120, and a sheath 130. The cladding 120 may define the hollow core 110 and include a single- or multiple-layer structure of material having a refractive index lower than or equal to that of air, in order to promote internal refraction of light traveling through the hollow core 110 (where the hollow core 110 material can be air).

In one implementation, the cladding 120 may include a plurality of air holes surrounding the hollow core 110 and arranged in a predetermined pattern in order to cause the photonic band gap effect, which may reflect light inside the hollow core 110. Myriad materials and/or structures for cladding 120 surrounding the hollow core 110 may be implemented to promote internal refraction of light in the hollow core fiber 100.

The sheath 130 may be an added layer of material configured to protect the hollow core fiber 100. For example, the hollow core fiber 100 may be submerged in a liquid and the sheath 130 may prevent the liquid from contacting the cladding 120 and penetrating into the hollow core 110. The sheath 130 may aid in cooling the hollow core fiber 100. For example, the sheath 130 may act as a heat sink and dissipate heat generated and transferred to the cladding 120. The sheath 130 may also provide additional structural integrity to the hollow core fiber 100.

FIG. 1B illustrates a fiber laser system, according to an exemplary implementation of the present disclosure. The fiber laser system of FIG. 1B is a mere example of one such system according to embodiments of the disclosed subject matter. Of course, fiber systems according to embodiments of the disclosed subject matter can have different configurations and components, including different electromagnetic radiation sources (e.g., light sources).

The fiber laser system may include a seed module 140 and an amplifier 150a. The fiber laser system may be a high power laser system, for example, a Class IV laser according to OSHA standards. The power may be 100 mW, 200 mW, 1 W, or higher, for instance.

The seed module 140 may be optically coupled to the amplifier 150a by an optical fiber, for example, the hollow core fiber 100. In one implementation, the seed module 140 may be configured to generate light that is directed into the amplifier 150a for amplification. In one implementation, the seed module 140 may be configured to generate a relatively high-power laser that may be directed into amplifier 150a for rectification due to any signal loss over a length of the optical fiber (e.g., hollow core fiber 100) connecting the two. One or more additional amplifiers 150z may be added to the fiber laser system as needed to rectify signal loss over a predetermined distance between the amplifier 150a and amplifiers 150z (herein referred to as amplifiers 150).

FIG. 2A illustrates the seed module 140, according to another exemplary implementation of the present disclosure. The seed module 140 may include a laser diode 205, at least one optical fiber 210, a pump signal combiner 220, a gain fiber 225, a fiber coupler 230, an isolator 235, a fiber tap 240, an output fiber 245, and one or more of the hollow core fiber 100. The seed module 140 may be configured to pump forwards (as shown) or backwards.

The laser diode 205 may be configured to emit light (electromagnetic radiation) having a predetermined wavelength at an output end thereof. For example, the predetermined wavelength of light may be 100 nm to 19,000 nm, preferably 190 nm to 1,900 nm. The laser diode 205 may produce light with varying numbers of modes. For example, the laser diode 205 may be a single mode laser or a multimode laser.

The optical fiber 210 may include an input, an output, and a first cladding layer surrounding a solid core medium extending a length of the optical fiber 210. For example, the solid core medium of the optical fiber 210 may be glass.

The pump signal combiner 220 may include an input and an output, and may be configured to couple light emitted from the laser diode 205 and light circulated through the seed module 140 into the gain fiber 225. The pump signal combiner 220 may be utilized as a fiber-optic coupler for sending pump and signal light into the amplifier 150a or a fiber, for example, the gain fiber 225.

The gain fiber 225 may include an input, an output, a doped core extending a length of the gain fiber 225, and a cladding layer surrounding the doped core. The gain fiber 225 may be configured to guide light coupled into the doped core, for example from the laser diode 205 (via the pump signal combiner 220), and amplify the coupled light through interaction with doping ions present in the doped core.

The fiber coupler 230 may include an input and an output, and may be configured to combine light received from the optical fiber 210 at the input of the fiber coupler 230, and to couple the combined light into a first length 100a of the hollow core fiber 100 at the output of the fiber coupler 230.

The isolator 235 may include an input and an output, and may be configured to receive light at the input thereof, allow light to travel in one direction, and prevent back reflections that occur after the isolator 235.

The fiber tap 240 may include an input and an output, and may be configured to monitor optical power of the light.

The output fiber 245 may include an input and an output, and may be configured to guide light out of the seed module 140.

In one implementation, the laser diode 205 may generate light having a first wavelength and a first amplitude, where such light may be emitted at the output of the laser diode 205, which may also be known as a pumping wavelength. The light may be generated optically or electrically, for instance.

The output of the laser diode 205 may be optically coupled to the input of the at least one optical fiber 210, and the at least one optical fiber 210 may guide light to the pump signal combiner 220. In one or more embodiments, light having been circulated through the seed module 140 (e.g., from hollow core fiber 100g) plus light emitted by the laser diode 205 may be combined in the pump signal combiner 220 and emitted via the output of the pump signal combiner 220 into the optically coupled input of the gain fiber 225.

Light traveling through the gain fiber 225 may interact with the doped core, and the signal of the light may be amplified. The light may excite ions into a higher energy from where the ions may decay via stimulated emission of a photon back to a lower energy level to generate light having a second wavelength and a second amplitude, also known as a signal or lasing wavelength. In a non-limiting example, an erbium doped fiber may include a silica fiber core doped with trivalent erbium ions. Such fiber may be efficiently pumped with a laser at a wavelength of 980 nm or 1,480 nm and exhibit gain in the 1,550 nm region, for instance.

The output end of the gain fiber 225 may be optically coupled to the input of the fiber coupler 230. The light may be emitted by the output of the gain fiber 225 into the input of the fiber coupler 230. In one implementation, the output of the gain fiber 225 is coupled to the input of the at least one optical fiber 210 via a solid core-to-solid core fiber splice 255. The solid core-to-solid core fiber splice 255 may join two ends of two optical fibers, for example, the output end of the gain fiber 225 and the input end of the at least one optical fiber 210. In one implementation, the output end of the gain fiber 225 may be optically coupled to the input end of the fiber coupler 230 directly. The fiber coupler 230 may be configured to receive light and direct the light into the first length 100a of hollow core fiber 100, denoted by the dashed line. Notably, the fiber coupler 230 may include components, for example, lenses, configured to couple the received light into the hollow core fiber 100 without creating an interface between the solid core of the gain fiber 225 with the hollow core fiber 100 or between the solid core of the at least one optical fiber 210 and the hollow core fiber 100. Such interface can reduce the introduction of non-linear effects.

In one implementation, light may travel a predetermined distance along the first length 100a of the hollow core fiber 100 until reaching the isolator 235. In one implementation, the first length 100a can meet a second length 100b that is optically coupled to the isolator 235, where the first length 100a can be spliced with the second length 100b via a hollow core-to-hollow core fiber splice 250. Similar to the solid core-to-solid core fiber splice 255, the hollow core-to-hollow core fiber splice 250 may join two ends of two optical fibers, for example, an output end of the first length 100a and an input end of the second length 100b. An output end of the second length 100b may be optically coupled to the isolator 235.

Light may travel through the isolator 235 in only one direction and into a third length 100c of the hollow core fiber 100. Notably, light traveling in the opposite (backwards) direction back towards the isolator 235 may enter the isolator 235, wherein the isolator 235 is configured to prevent the light traveling in the opposite direction from being emitted through the input end of the isolator 235. That is to say, the isolator 235 may directionally filter out back reflections that travel backwards and could potentially damage sensitive components. Additionally, the isolator 235 may filter the light for predetermined wavelengths before the light is emitted from the isolator 235.

In one implementation, the light traveling (in the forward direction) via the third length 100c may travel a predetermined distance until reaching the fiber tap 240. In one implementation, the third length 100c can meet a fourth length 100d that is optically coupled to the fiber tap 240, and the third length 100c can be spliced with the fourth length 100d via another hollow core-to-hollow core fiber splice 250.

Light may travel through the fiber tap 240 where the fiber tap 240 may monitor and adjust the optical power of the light. The fiber tap 240 may be unidirectional in behavior, providing an output signal for the light propagating in the forward direction but not in the backwards direction. This may be advantageous for measuring the power in one direction, independent of reflected or returning signals. Bidirectional fiber taps 240 may also be used. The fiber tap 240 may also be configured to divert a portion of the light towards the output optical fiber 245. The emitted light may have an optical power output (peak, average, etc.) of 10 mW to 100 kW, or preferably, 1 mW to 100 W.

In one implementation, the light may travel through the fiber tap 240 and into a fifth length 100e of the hollow core fiber 100. Light traveling via the fifth length 100e optionally may be emitted from the seed module 140 without routing any light back into the seed module 140. For example, the light may be directed towards from the seed module 140 to the first amplifier 150a for amplification.

In one implementation, light traveling (in the forward direction) via the fifth length 100e may travel a predetermined distance until reaching a circulating fiber coupler 230a. Similarly, the light may meet a sixth length 100f of hollow core fiber 100 and splice with the sixth length 100f via another hollow core-to-hollow core fiber splice 250, or, alternatively, be directly directed to the circulating fiber coupler 230a.

The circulating fiber coupler 230a may be configured to split the light and emit a portion of the light out of the seed module 140 via the output fiber 245 and circulate another portion of the light back toward the pump signal combiner 220 via a feedback hollow core optical fiber 100g, for instance. Notably, the light traveling via the feedback hollow core optical fiber 100g may be combined with light emitted by the laser diode 205 inside the pump signal combiner 220 without introducing non-linear effects.

The seed module 140 may be, for example, a distributed feedback laser (DFBL) and utilize a fiber coupled diode using micro-optics to couple into the output fiber 245. Notably, the output fiber 245 may be solid core or hollow core.

Figure 2B:
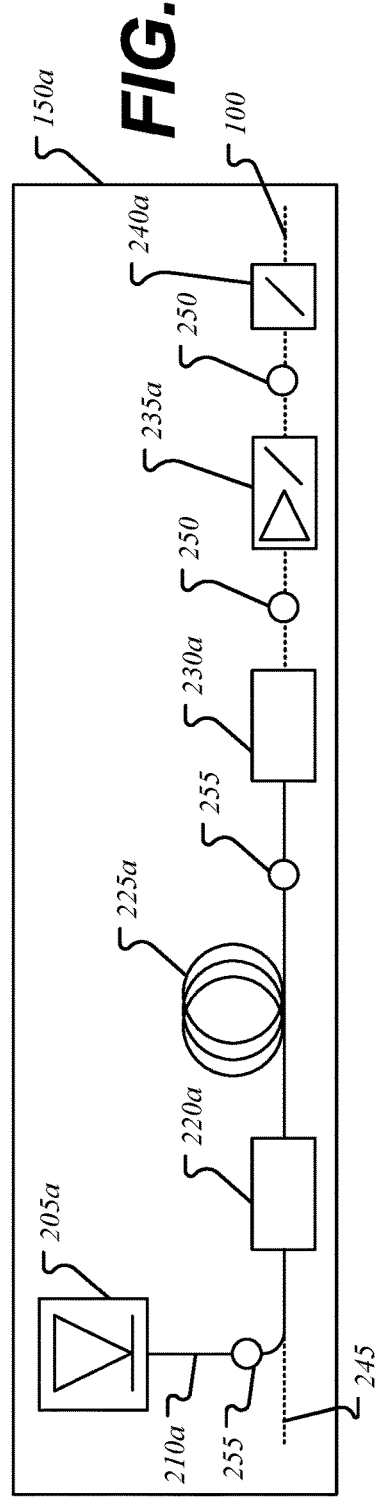
FIG. 2B is block diagram of an amplifier according to one or more embodiments of the present disclosure.

FIG. 2B illustrates an amplifier 150a, according to an exemplary implementation of the present disclosure. The amplifier 150a may include an amplifier laser diode 205a, at least one amplifier optical fiber 210a, an amplifier pump signal combiner 220a, an amplifier gain fiber 225a, an amplifier fiber coupler 230a, an amplifier isolator 235a, an amplifier fiber tap 240a, and the hollow core fiber 100.

The amplifier 150a may be configured to amplify light received from another light source, for example, light received from the seed module 140. After traveling a predetermined distance via the output fiber 245, the light may lose intensity. The amplifiers 150a may couple the light received from the output fiber 245 with light produced in the laser diode 205a of the amplifiers 150a inside the amplifier pump signal combiner 220a. After passing through the amplifier 150a, in a similar progression to that of the seed module 140, wherein the amplifier components can have functionality similar to that of the seed module 140, the optical power of the light may be rectified and emitted. In one implementation, the light emitted by the amplifier laser diode 205a may combine with the light from the output fiber 245 from the seed module 140 via the amplifier pump signal combiner 220a. The combined light may be directed to the amplifier gain fiber 225a, which can include an input, an output, a doped core extending a length of the amplifier gain fiber, and a cladding layer surrounding the doped core and configured to guide light coupled into the doped core. Similar to the gain fiber 225, light traveling through the amplifier gain fiber 225a may interact with the doped core such that the signal of the combined light is amplified.

Light may travel to the amplifier fiber coupler 230a, which may include an input and an output, where the amplifier fiber coupler 230a can combine electromagnetic radiation received at the input and couple the combined light into the at least one hollow core fiber 100 at the output.

The combined light may travel to and through the amplifier isolator 235a in only one direction and into the amplifier fiber tap 240a. The combined light may then travel through the amplifier fiber tap 240a where the amplifier fiber tap 240a may monitor and adjust the optical power of the combined light. One or more core-to-hollow core fiber splices 250 and/or one or more solid core-to-solid core fiber splices 255 may be implemented, such as shown in FIG. 2B. According to embodiments of the disclosed subject matter, emitted light (e.g., from seed module 140) may travel to and through multiple additional amplifiers 150 or terminate at a target device.

As discussed at the outset, for a fiber laser system utilizing solid core optical fibers, light amplified between stages (amplifiers) can result in a diameter increase of the solid core in order to handle the non-linear effects built up in the fiber laser system, for example, those created from splice interfaces between solid core optical fibers. In a related issue, lengths for the solid core optical fibers may be kept short. Utilizing lengths of the hollow core fiber 100 in the fiber laser system, for example, to couple components in the seed module 140 and the amplifiers 150, may reduce build-up of non-linear effects, since, generally speaking, splicing two lengths of hollow core fiber 100 together end-to-end does not produce an interface that would result in introduction of non-linear effects. This lack of such splice interface, therefore, can allow light to travel longer distances in the hollow core fiber 100 without a reduction in signal strength. Thus, length constraints may be less limiting when building the fiber laser system since spectral quality of the signal is preserved over longer distances in the hollow core fiber 100. Moreover, preservation of the hollow core fiber 100 diameter can be maintained throughout the system.

Implementations of the disclosed subject matter may also be as set forth in the following parentheticals.

(1) An optical system, comprising: a seed module configured to generate and output electromagnetic radiation at a second predetermined amplitude and at a second predetermined wavelength, the seed module including: a laser diode configured to emit electromagnetic radiation having a first predetermined amplitude and a first predetermined wavelength, a pump signal combiner configured to couple the electromagnetic radiation from the laser diode and electromagnetic radiation circulated through the seed module, a gain fiber including an input, an output, a doped core extending a length of the gain fiber, and a third cladding layer surrounding the doped core, and configured to guide electromagnetic radiation coupled into the doped core from the pump signal combiner, a first non-hollow core optical fiber configured to guide electromagnetic radiation, the first non-hollow core optical fiber having a first cladding layer surrounding a solid core medium extending a length of the first non-hollow core optical fiber, a first hollow core optical fiber configured to guide electromagnetic radiation, the first hollow core optical fiber having a second cladding layer surrounding a hollow core extending a length of the first hollow core optical fiber, a fiber coupler that couples the first non-hollow core optical fiber to the first hollow core optical fiber so as to pass electromagnetic radiation from the first non-hollow core optical fiber to the first hollow core optical fiber, a second hollow core optical fiber configured to guide electromagnetic radiation, the second hollow core optical fiber having the second cladding layer surrounding the hollow core extending a length of the second hollow core optical fiber, and a feedback hollow core optical fiber configured to feedback electromagnetic radiation at an output of the seed module to the pump signal combiner; and an output hollow core optical fiber optically coupled to the seed module and configured to output electromagnetic radiation to outside the seed module.

(2) The optical system of (1), wherein the electromagnetic radiation coupled into the gain fiber generates a laser beam at the output end of the gain fiber, the fiber coupler receiving the laser beam at the input end of the fiber coupler and guiding the laser beam into the at least one hollow core fiber.

(3) The optical system of either (1) or (2), wherein a range of the second predetermined wavelength of the electromagnetic radiation the seed module generates and outputs is 190 nm to 10,000 nm.

(4) The optical system of any one of (1)-(3), wherein the seed module emits electromagnetic radiation having an average optical power output of 1 mW to 10 kW (5) The optical system of any one of (1)-(4), wherein the seed module is a multimode laser.

(6) The optical system of any one of (1)-(5), wherein the light coupled into the doped core of the gain fiber produces gain for the light via interaction with doping ions in the doped core.

(7) The optical system of any one of (1)-(6), further comprising an optical isolator configured to direct electromagnetic radiation only in a predetermined direction, wherein the laser diode is configured to forward pump, and wherein the fiber coupler is optically coupled to the optical isolator by a third hollow core optical fiber.

(8) The optical system of any one of (1)-(7), further comprising an optical fiber tap configured to monitor and adjust the received electromagnetic radiation, wherein the optical isolator is optically coupled to the optical fiber tap by a fourth hollow core optical fiber.

(9) The optical system of any one of (1)-(8), wherein the optical isolator emits the electromagnetic radiation out of the seed module.

(10) The optical system of any one of (1)-(9), further comprising an output fiber coupler configured to split the received electromagnetic radiation, wherein a first portion of the electromagnetic radiation is emitted out of the seed module, and wherein a second portion of the electromagnetic radiation is circulated back to the pump signal combiner.

(11) The optical system of any one of (1)-(10), wherein the seed module is a ring cavity laser.

(12) The optical system of any one of (1)-(11), further comprising at least one amplifier, including at least one amplifier optical fiber including an input, an output, and a third cladding layer surrounding a solid core medium extending a length of the amplifier optical fiber, an amplifier gain fiber including an input, an output, the doped core extending a length of the amplifier gain fiber, and a third cladding layer surrounding the doped core and configured to guide light coupled into the doped core, an amplifier laser diode configured to emit electromagnetic radiation having the second predetermined wavelength at an output, an amplifier pump signal combiner including an input and an output, and configured to couple electromagnetic radiation from the amplifier laser diode and received electromagnetic radiation into the amplifier gain fiber, an amplifier fiber coupler including an input and an output, the amplifier fiber coupler configured to combine electromagnetic radiation received from the at least one amplifier optical fibers at the input and couple the combined electromagnetic radiation into the at least one hollow core fiber at the output, and an amplifier output fiber configured to guide the electromagnetic radiation out of the amplifier seed module, wherein the output of the amplifier laser diode is optically coupled to the input of the at least one amplifier optical fiber, wherein the output of the at least one amplifier optical fiber is optically coupled to the input of the amplifier pump-signal combiner, wherein the output of the amplifier pump-signal combiner is optically coupled to the input of the amplifier gain fiber, wherein the output end of the amplifier gain fiber is optically coupled to the input of the at least one amplifier fiber coupler, wherein the output of the at least one amplifier fiber coupler is optically coupled to the input of the second hollow core optical fiber, and wherein the output of the second hollow core optical fiber is optically coupled to the amplifier output fiber.

(13) The optical system of any one of (1)-(12), wherein the seed module and the amplifier are optically coupled by the second hollow core optical fiber.

(14) The optical system of any one of (1)-(13), wherein the second hollow core optical fiber is the output hollow core optical fiber that is configured to output electromagnetic radiation to outside the seed module.

(15) The optical system of any one of (1)-(14), wherein the first wavelength generated by the laser diode is a pumping wavelength.

(16) The optical system of any one of (1)-(15), wherein the second wavelength generated by the seed module is a lasing wavelength.

(17) An optical system, comprising: a seed module configured to generate and output electromagnetic radiation at a second predetermined amplitude and at a second predetermined wavelength, the seed module including: a laser diode configured to emit electromagnetic radiation having a first predetermined amplitude and a first predetermined wavelength, a hollow core optical fiber configured to guide electromagnetic radiation, the first hollow core optical fiber having a first cladding layer surrounding a hollow core extending a length of the hollow core optical fiber, and a gain fiber including an input, an output, a doped core extending a length of the gain fiber, and a second cladding layer surrounding the first doped core, and configured to guide electromagnetic radiation coupled into the doped core from a pump signal combiner; and an amplifier configured to output electromagnetic radiation at the second predetermined amplitude and the second predetermined wavelength, the amplifier including: an amplifier gain fiber including an input, an output, and the doped core, the doped core extending a length of the amplifier gain fiber, and a third cladding layer surrounding the doped core and configured to guide light coupled into the doped core, and an amplifier laser diode configured to emit electromagnetic radiation having the second predetermined wavelength at an output, wherein the seed module is optically coupled to the amplifier by the hollow core optical fiber, and wherein the output of the gain fiber is optically coupled to the hollow core optical fiber and light produced from the gain fiber is configured to be emitted by the seed module and directed to the amplifier by the hollow core optical fiber.

(18) The optical system of (17), wherein the optical isolator emits the electromagnetic radiation out of the seed module.

(19) The optical system of any one of (17) or (18), further comprising an output fiber coupler configured to split the received electromagnetic radiation, wherein a first portion of the electromagnetic radiation is emitted out of the seed module, and wherein a second portion of the electromagnetic radiation is circulated back to the pump signal combiner.

(20) An optical system, comprising: a seed module configured to generate and output electromagnetic radiation at a second predetermined amplitude and at a second predetermined wavelength, the seed module including: a first hollow core optical fiber having a first cladding layer surrounding a hollow core extending a length of the first hollow core optical fiber, the first hollow core optical fiber optically coupling a laser diode configured to emit electromagnetic radiation having a first predetermined amplitude and a first predetermined wavelength, a gain fiber including a doped core extending a length of the gain fiber, a fiber coupler, and a first non-hollow core optical fiber, and an output hollow core optical fiber optically coupled to an output of the first hollow core optical fiber and configured to output electromagnetic radiation to outside the seed module.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. An optical system, comprising:
    a seed module configured to generate and output electromagnetic radiation at a second predetermined amplitude and at a second predetermined wavelength, the seed module including:
        a laser diode configured to emit electromagnetic radiation having a first predetermined amplitude and a first predetermined wavelength,
        a pump signal combiner configured to couple the electromagnetic radiation from the laser diode and electromagnetic radiation circulated through the seed module,
        a gain fiber including an input, an output, a doped core extending a length of the gain fiber, and a third cladding layer surrounding the doped core, and configured to guide electromagnetic radiation coupled into the doped core from the pump signal combiner,
        a first non-hollow core optical fiber configured to guide electromagnetic radiation, the first non-hollow core optical fiber having a first cladding layer surrounding a solid core medium extending a length of the first non-hollow core optical fiber,
        a first hollow core optical fiber configured to guide electromagnetic radiation, the first hollow core optical fiber having a second cladding layer surrounding a hollow core of the first hollow core optical fiber that extends a length of the first hollow core optical fiber,
        a fiber coupler that couples the first non-hollow core optical fiber to the first hollow core optical fiber so as to pass electromagnetic radiation from the first non-hollow core optical fiber to the first hollow core optical fiber,
        a second hollow core optical fiber configured to guide electromagnetic radiation, the second hollow core optical fiber having the second cladding layer surrounding a hollow core of the second hollow core optical fiber that extends a length of the second hollow core optical fiber, and
        a feedback hollow core optical fiber configured to feedback electromagnetic radiation at an output of the seed module to the pump signal combiner; and
    an output hollow core optical fiber optically coupled to the seed module and configured to output electromagnetic radiation to outside the seed module.

2. The optical system of claim 1,
    wherein the gain fiber is configured to generate a laser beam at the output thereof based on the electromagnetic radiation coupled into the gain fiber at the input thereof, and
    wherein the fiber coupler is configured to receive the laser beam at an input thereof and guide the laser beam into the first hollow core optical fiber or the second hollow core optical fiber.

3. The optical system of claim 1, wherein a range of the second predetermined wavelength of the electromagnetic radiation the seed module generates and outputs is 190 nm to 10,000 nm.

4. The optical system of claim 1, wherein the seed module is configured to emit electromagnetic radiation having an average optical power output of 1 mW to 10 kW.

5. The optical system of claim 1, wherein the seed module is a multimode laser.

6. The optical system of claim 1, wherein the doped core of the gain fiber is configured to provide gain to the electromagnetic radiation coupled into the gain fiber via interaction with doping ions in the doped core.

7. The optical system of claim 1, further comprising an optical isolator configured to direct electromagnetic radiation in a predetermined direction,
    wherein the laser diode is configured to forward pump, and
    wherein the fiber coupler is optically coupled to the optical isolator by a third hollow core optical fiber.

8. The optical system of claim 7, further comprising an optical fiber tap configured to monitor and adjust electromagnetic radiation received from the optical isolator,
    wherein the optical isolator is optically coupled to the optical fiber tap by a fourth hollow core optical fiber.

9. The optical system of claim 7, wherein the optical isolator is configured to emit the electromagnetic radiation to outside the seed module.

10. The optical system of claim 8, further comprising an output fiber coupler configured to split received electromagnetic radiation,
    wherein a first portion of the split electromagnetic radiation is emitted to outside the seed module, and
    wherein a second portion of the split electromagnetic radiation is circulated back to the pump signal combiner.

11. The optical system of claim 10, wherein the seed module is a ring cavity laser.

12. The optical system of claim 1, further comprising at least one amplifier, including:
    at least one amplifier optical fiber including an input, an output, and a fourth cladding layer surrounding a solid core medium extending a length of the at least one amplifier optical fiber,
    an amplifier gain fiber including an input, an output, a doped core extending a length of the amplifier gain fiber, and the third cladding layer surrounding the doped core and configured to guide electromagnetic radiation coupled into the doped core,
    an amplifier laser diode configured to emit electromagnetic radiation having the second predetermined wavelength at an output thereof,
    an amplifier pump signal combiner including an input and an output, and configured to couple electromagnetic radiation from the amplifier laser diode and received electromagnetic radiation into the amplifier gain fiber,
    an amplifier fiber coupler including an input and an output, the amplifier fiber coupler configured to combine electromagnetic radiation received from the at least one amplifier optical fiber at the input thereof and couple the combined electromagnetic radiation to the first or the second hollow core optical fiber at via the output thereof, and an amplifier output fiber configured to guide electromagnetic radiation out to the seed module, wherein the output of the amplifier laser diode is optically coupled to the input of the at least one amplifier optical fiber, wherein the output of the at least one amplifier optical fiber is optically coupled to the input of the amplifier pump signal combiner, wherein the output of the amplifier pump signal combiner is optically coupled to the input of the amplifier gain fiber, wherein the output of the amplifier gain fiber is optically coupled to the input of the amplifier fiber coupler, wherein the output of the amplifier fiber coupler is optically coupled to the input of the second hollow core optical fiber, and wherein the output of the second hollow core optical fiber is optically coupled to the amplifier output fiber.

13. The optical system of claim 12, wherein the seed module and the at least one amplifier are optically coupled by the second hollow core optical fiber.

14. The optical system of claim 1, wherein the second hollow core optical fiber is the output hollow core optical fiber that is configured to output electromagnetic radiation to outside the seed module.

15. The optical system of claim 1, wherein the first predetermined wavelength generated by the laser diode is a pumping wavelength.

16. The optical system of claim 1, wherein the second predetermined wavelength generated by the seed module is a lasing wavelength.

17. An optical system, comprising:
a seed module configured to generate and output electromagnetic radiation at a second predetermined amplitude and at a second predetermined wavelength, the seed module including:
  a laser diode configured to emit electromagnetic radiation having a first predetermined amplitude and a first predetermined wavelength,
  a hollow core optical fiber configured to guide electromagnetic radiation, the first hollow core optical fiber having a first cladding layer surrounding a hollow core extending a length of the hollow core optical fiber, and
  a gain fiber including an input, an output, a first doped core extending a length of the gain fiber, and a second cladding layer surrounding the first doped core, and configured to guide electromagnetic radiation coupled into the first doped core from a pump signal combiner; and an amplifier configured to output electromagnetic radiation at the second predetermined amplitude and the second predetermined wavelength, the amplifier including:
  an amplifier gain fiber including an input, an output, and a second doped core, the second doped core extending a length of the amplifier gain fiber, and a third cladding layer surrounding the second doped core and configured to guide electromagnetic radiation coupled into the second doped core, and
  an amplifier laser diode configured to emit electromagnetic radiation having the second predetermined wavelength at an output thereof,
wherein the seed module is optically coupled to the amplifier by the hollow core optical fiber, and
wherein the output of the gain fiber is optically coupled to the hollow core optical fiber, and the electromagnetic radiation produced from the gain fiber is emitted by the seed module and directed to the amplifier by the hollow core optical fiber.

18. The optical system of claim 17, wherein the seed module further includes an optical isolator configured to emit electromagnetic radiation out of the seed module.

19. The optical system of claim 17, further comprising an output fiber coupler configured to split received electromagnetic radiation such that a first portion of the split electromagnetic radiation is emitted out of the seed module and a second portion of the split electromagnetic radiation is circulated back to a pump signal combiner of the seed module.

20. A seed module comprising:
a first hollow core optical fiber having a first cladding layer surrounding a hollow core extending a length of the first hollow core optical fiber, the first hollow core optical fiber optically coupling a laser diode configured to emit electromagnetic radiation having a first predetermined amplitude and a first predetermined wavelength;
a gain fiber including a doped core extending a length of the gain fiber;
a fiber coupler;
a first non-hollow core optical fiber; and
an output hollow core optical fiber optically coupled to an output of the first hollow core optical fiber and configured to output electromagnetic radiation to outside the seed module,
wherein the seed module is configured to generate and output electromagnetic radiation at a second predetermined amplitude and at a second predetermined wavelength based on the electromagnetic radiation having the first predetermined amplitude and the first predetermined wavelength.

* * * * *